May 4, 1965    J. A. ANANIA    3,181,824
SPACECRAFT RE-ENTRY RETARDING MEANS
Filed Oct. 22, 1963    10 Sheets-Sheet 1

FIG.1.

INVENTOR
James A. Anania

BY *Thomas, Weisman & Russell*

ATTORNEYS

INVENTOR.
James A. Anania

FIG. 4.

INVENTOR.
James A. Anania

May 4, 1965 J. A. ANANIA 3,181,824
SPACECRAFT RE-ENTRY RETARDING MEANS
Filed Oct. 22, 1963 10 Sheets-Sheet 6

INVENTOR
James A. Anania

May 4, 1965   J. A. ANANIA   3,181,824
SPACECRAFT RE-ENTRY RETARDING MEANS
Filed Oct. 22, 1963   10 Sheets-Sheet 7

FIG. 8.

INVENTOR
James A. Anania

BY Thomas, Weisman & Russell
ATTORNEYS

FIG. 10.

United States Patent Office 3,181,824
Patented May 4, 1965

3,181,824
SPACECRAFT RE-ENTRY RETARDING MEANS
James A. Anania, Newark, N.J., assignor of thirty-three percent each to Frederick Carlton Holle, Hasbrouck Heights, and Otto Sass, Irvington, N.J., and two percent each to Vincent Flaherty and Doris Marie Flaherty, both of Orange, N.J.
Filed Oct. 22, 1963, Ser. No. 318,017
5 Claims. (Cl. 244—138)

This invention relates to an improvement in spacecraft and is particularly concerned with a device for retarding descent of a space vehicle or capsule upon its return into the atmosphere following a period of flight thereof after being propelled into space or the upper regions of the stratosphere by rocket power.

Heretofore various forms of devices, including parachutes and autorotational rotors, have been proposed for achieving retarded descent of such spacecraft. In actual practice, however, it appears that only the parachute type has been utilized.

In those instances where some form of blade rotation has been devised, for example, as a means to lower heavy bulk objects from aircraft, the problem concentrated upon has generally been one with respect to means to vary the blade pitch, such means offering an adjustable resistance to the supporting air, and thus varying the speed of descent. Also, in certain prior art devices the problem encountered has been one of auto-gyric effect where the motion of the blades is self-induced, or perhaps more accurately stated, is induced by the resultant air pressure thereagainst. In addition, no satisfactory mechanism, based upon the helicopter principle, has been proffered in the past suitable for use with respect to the lowering of a space capsule; in this regard known devices having a particular relationship with respect to aircraft are either too complex or too bulky to meet the requirements which must be met in the firing of any object of considerable size into outer space. An appropriate device, such as presented by the instant invention, must be compacted to a maximum degree and yet provide mechanism so efficient in its essential nature that failure of the lowering device is completely eliminated.

The instant invention fulfills all of the basic and essential requirements for lowering of the capsule, namely: compactness of design, ease of operation, sureness of result, and adjustability of rotor speed. With regard to the latter item and unlike devices heretofore designed for a somewhat similar purpose, the rotors or blades are here rotated by mechanism contained within the capsule. Depending upon the thinness of the atmosphere and depending upon the speed of descent, speed of rotation is a variable factor, and that speed can be predetermined and fully controlled either by the operator or by ground control through suitable and known electronic equipment.

The general object of the present invention is to provide a rotary blade type device for retarding descent of such craft under the control of the operator aboard the craft, or alternatively, control by instruments carried in the space capsule which are in turn actuated by suitable radio signals from a ground station.

Another object of the invention is to provide a device of the character generally referred to in the foregoing which embodies a plurality of rotary blades each initially disposed generally lengthwise of the longitudinal axis of the rotor during sustained flight thereof, and retained in such position until released by means actuatable from the interior of the craft and under the control of the operator aboard the same. Such blades, however, are so arranged and constructed as to be substantially instantly movable from such initial retracted position into an operative position for immediate rotating movement to retard descent of the craft.

A further object of the invention is to provide a device as above set forth wherein the blades of the rotor, after release from their above-mentioned initial position, are rotatable by power actuation controllable by the operator aboard the craft or in response to suitable radio signals from a ground station.

A further objective of the invention is the provision of means, in a device of the type heretofore generally described, which causes positive release, in unison, of the several blade members, such positive release actually forcing the blades outwardly with the required degree of thrust so that chances of failure are, in all practicality, completely eliminated. Further, the blade actuation from a retracted position to an extended, operative position is instantaneous, rather than gradual, so that here again the operator has within his control a means of descent that may become effected within split second timing. This objective of the invention is obtained by a unique gear and linkage system that permits of immediate actuation of the blade retention means with instantaneous extension of the blades, upon actuation of this means.

Another object of the invention is the provision, in a mechanism of this type, of means to accurately counterbalance blade weight, so that each blade in its movement from inoperative to operative position is completely balanced, a factor which permits of instantaneous outward movement of the blades, and in unison with each other. This again is an effective measure assuring instantaneous response of the blades from inactive to operative position. Such features permit the astronaut to time his descent with great accuracy, and of course, in line with objectives of the invention already mentioned, to control the rate of descent so that landing upon the earth's surface, whether the latter be ground or water, is accomplished at a rate of speed to completely eliminate shock to the operator or damage to the capsule. Regarding control of such rate of speed, and as indicated in the foregoing, with actuation of the rotating blade elements the speed can be reduced to almost zero amount for the capsule itself then becomes in effect, a type of helicopter apparatus.

The foregoing and other objects and advantages of the invention will be more clearly apparent from the following detailed description of the preferred embodiments thereof, and from the accompanying drawings in which like figures refer to like component parts, and in which.

Stated briefly, the device in accordance with the invention utilizes a plurality of counterbalanced blades mounted around a rotatable hub positioned at the upper or outer end of the device. The blades and their respective counterweights are arranged for pivotal movement relative to the axis of the hub so that the blades in their inoperative position may each be disposed with their longitudinal axes extending lengthwise of the device. The blades are retained in such position while biased for outward pivotal movement by spring means which rapidly and practically instantaneously move the blades and their respective counterweights to operative position when the retaining means are released by means actuated from the interior of the craft.

Figure 1:
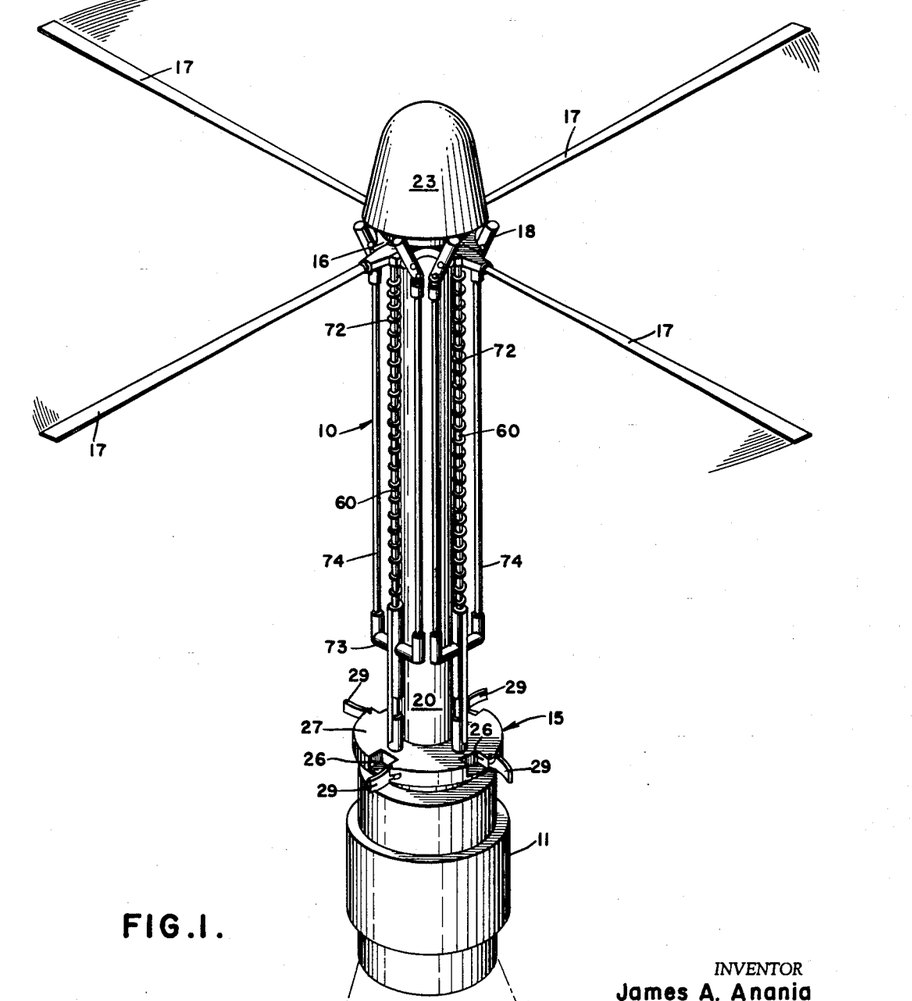
FIGURE 1 is a view in perspective of the device of the invention in operative position for retarding descent of a capsule by which it is carried, the housing therefor having been removed.

Further, in accordance with the invention, the device embodies means actuatable under the control of an occupant of the craft or by a control system in response to radio signal from the ground, to effect rotary movement of the hub carrying the blades, when the latter in their aforementioned pivotal movement have reached or approach the position illustrated in FIGURE 1. Means are also provided for automatically locking the blades and their respective counterweights when they have reached their operative position upon pivotal movement thereof from their initial position in relation to the hub.

The blades are retained in their initial, inoperative position in opposition to the force of a spring means which biases them for pivotal movement to their operative position, by gates serving as closures for recesses spaced from one another circumferentially along the outer periphery of a circular plate mounted adjacent the lower end of the device. Each of these recesses is adapted to receive the outboard end of one of the blades in its inoperative position. The gates are actuatable in unison from their closed to their open position for releasing the blades. This actuation is achieved by a linkage system so arranged that the required pivotal opening movement of the gates may be effected by a relatively small movement of the means which move the links to the extent required for releasing the blades for their above-mentioned pivotal movement.

Referring now to the drawings, the device of the invention is indicated generally by reference numeral 10. It is illustrated in the drawings as an assembly mounted on the upper end of a capsule or vehicle shown schematically at 11, during its descent after re-entry into the atmosphere following a flight in space into which it has been propelled by a rocket 12 (indicated in dotted line), or booster stage, from which it is separated at a desired point in the trajectory of its upward flight.

As illustrated in the drawings, the device hereof comprises a base portion indicated generally at 15, mounted adjacent the upper end of the capsule, a rotatable hub 16 spaced a substantial distance above the base and mounted for rotation relative to the capsule on an axis in alignment with the longitudinal axis of the capsule, and a series of blades 17 and associated counterweights, generally indicated at 18, pivoted to the hub.

Figure 5:
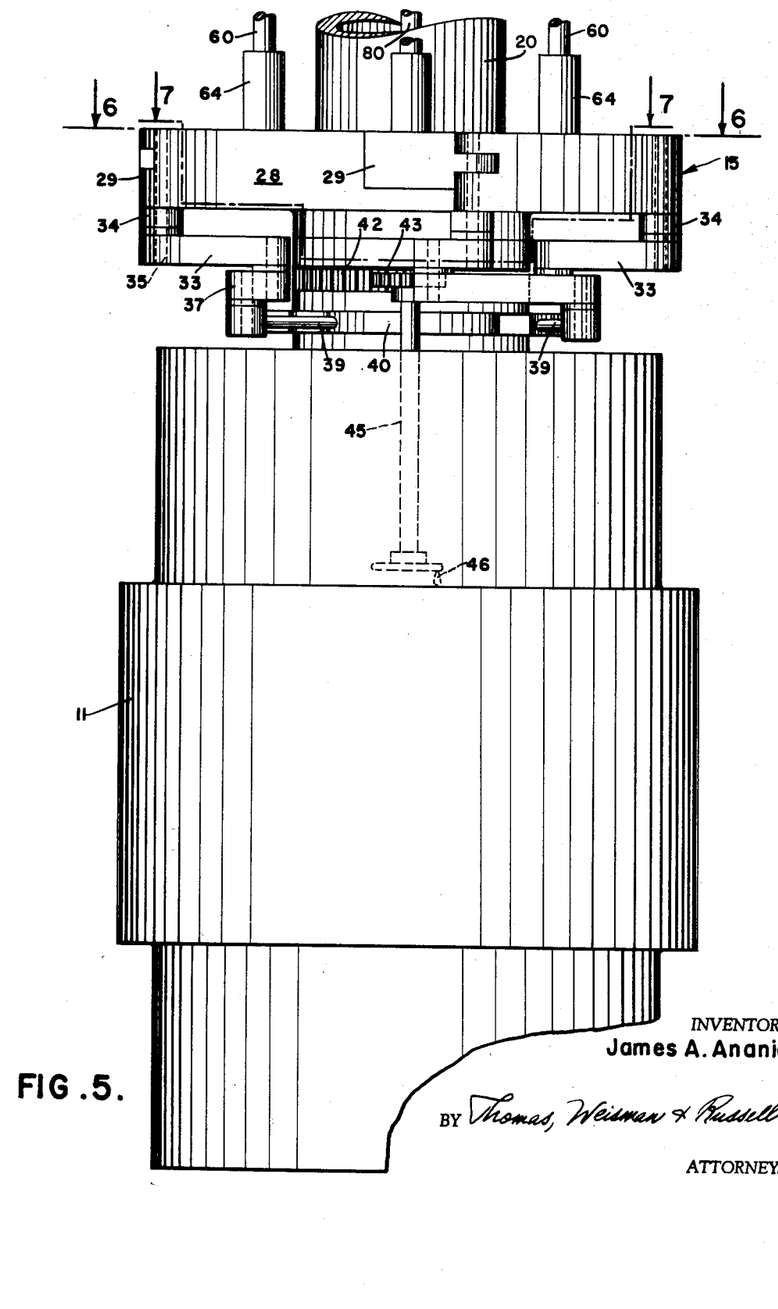
FIGURE 5 is a similar view taken at the lower end of the device, i.e., adjacent the point of its attachment to the capsule.

Extending upwardly through the center of the base portion and in fixed position relative to the capsule is a tubular member 20 (see FIGURE 5), adjacent the upper end of which is fixed a bearing support 22 (FIGURE 11) for the rotary hub to which the blades and counterweights are pivoted. Such bearing support, or journal, 22, is affixed to the element 20 by any suitable means, as threaded elements 22a.

Figure 2:
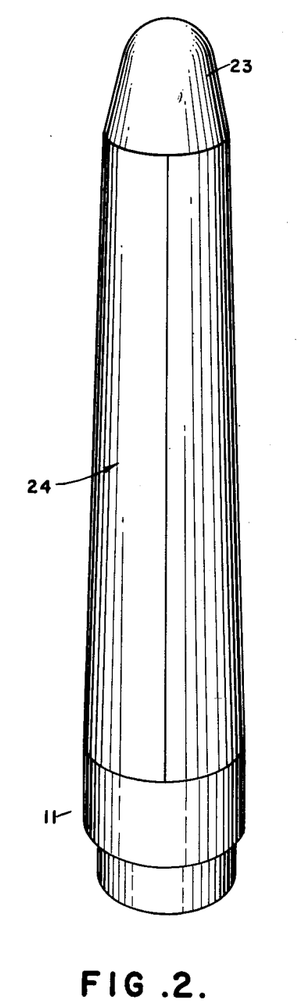
FIGURE 2 is a view in elevation showing the device with the parts thereof enclosed by a detachable shield or housing during flight prior to release of the blades for rotation to retard descent of the capsule.
Figure 3:
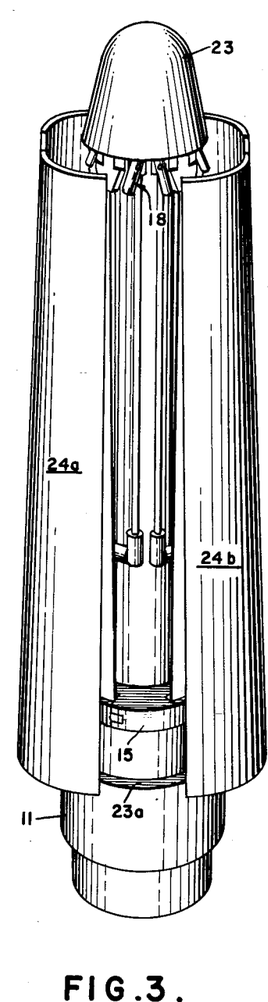
FIGURE 3 is a similar view illustrating the shield immediately after release thereof for being cast away from the device.

Suitably supported so as to surmount the hub and the parts associated therewith is a nose cone 23 of streamlined surface contour, as of the configuration shown in FIGURES 1 to 3.

Surrounding the device so as to shield the same during flight and while the rotary blades are retained in their inoperative position is a discardable shield, generally indicated at 24, and of frustoconical shape as illustrated in FIGURE 2. It extends lengthwise from the lower peripheral edge of the nose cone 23 to an appropriate circumferal ledge 23a formed at a suitable location on the exterior of the capsule. Desirably, this shield is composed of two longitudinal half-sections 24a and 24b held together by frangible bolts or other suitable and non-permanent fastening means which may be exploded in any known or conventional manner to separate the two halves of the shield from one another for discarding the same upon, or at a desired instant after, re-entry of the capsule into the atmosphere.

Base portion 15 includes the pivoted gates for retaining the rotor blades in their inoperative position, and the mechanism for operating the gates to release the blades for their pivotal movement to operative position. The base portion 15 also serves to support the spring-biased means for pivotally moving the blades and their counterweights to operative position.

As above stated, the blades 17 in their inoperative position are each disposed with the longitudinal axis thereof extending lengthwise of the axis of tubular member 20, i.e., more or less parallel thereto. As already indicated, the several blades are housed, in operative position, within the housing 24. The separate sections of the latter, semi-circular portions 24a and 24b, are temporarily affixed to the nose cone of the capsule; upon re-entry, these two sections are removed by suitable mechanism, i.e., as by an explosive force which separates them from the nose cone (as indicated in FIGURE 2) and with such force as to dispose them at a considerable distance from the nose cone itself. With removal of this housing or casing 24, the interior blade controlling system is exposed and the latter is more particularly described in the following.

Figure 6:
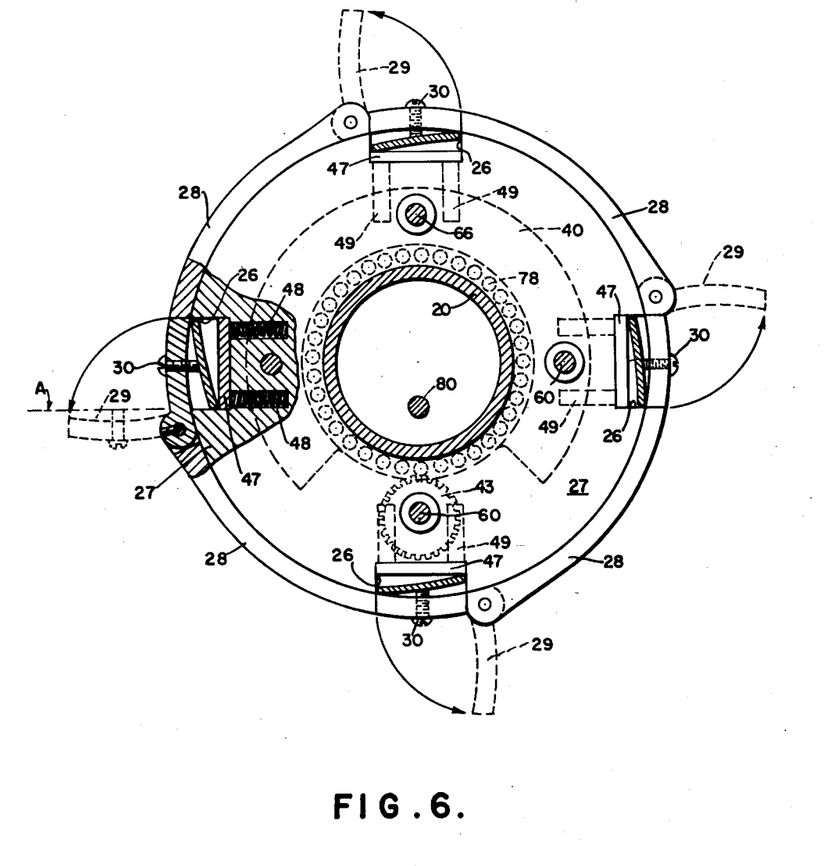
FIGURE 6 is a transverse view taken along line 6—6 of FIGURE 5.

As best shown in FIGURE 6, the lower or outer end of each blade as thus disposed extends into one of the four recesses 26 spaced circumferentially from one another along the outer periphery of a circular plate or disc 27 surrounding tube 20 adjacent its lower end and mounted so as to be rotatable relative thereto.

Figure 8:
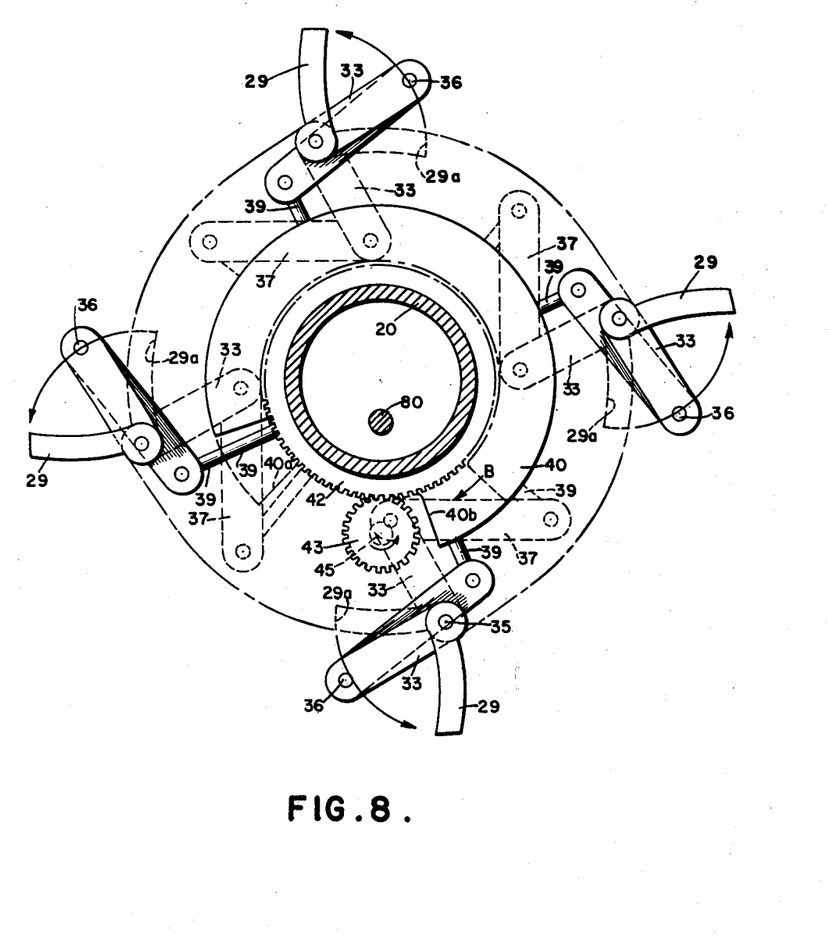
FIGURE 8 is a view similar to FIGURE 7, but showing the parts in a different position.
Figure 9:
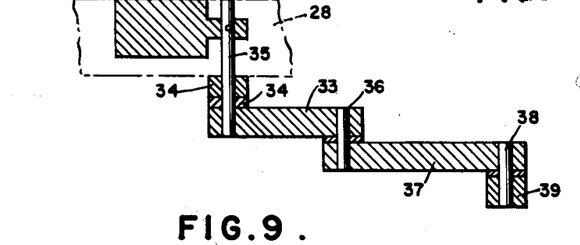
FIGURE 9 is a longitudinal sectional view taken along lines 9—9 of FIGURE 7.

The lower end of each blade is confined within one of the recesses 26 by means of a closure or gate 29 formed as part of the outer peripheral wall of the encircling member 28 and pivoted at one side of four respective openings formed therein, and indicated at 29a (FIGURE 8). Firm retention of the lower end of each blade at its angular repose within such respective recess 29 may be assisted by means of an adjustable screw or wedging element 30 extending through the gate so as to bear upon the outer surface of the blade.

With regard to the element 30, it should be observed that such, under any circumstance, should be of that length as not to interfere with the outward movement of each blade 17 when the blade actuating mechanism is triggered. For example, and viewing FIGURE 6, the element 30 should be of that length, and no greater, than the length indicated in dotted line of such figure, or of a length not to extend beyond line A, as indicated in the figure. The latter line graphically indicates the line of travel of the blade from its retracted to its operative or extended position.

As above indicated, base portion 15 of the device also includes the mechanism for opening the gates 29 in order that the blades may be quickly released for pivotal movement to their operative position. This mechanism, in accordance with the invention, is constructed and arranged to move the gates in unison from their closed position in which they restrain outward pivotal movement of the blades, to open position (shown in dotted outline in FIGURE 6) for releasing the blades for such movement.

For that purpose, there is utilized the mechanism shown particularly in FIGURES 5 to 9. This arrangement comprises an assembly of links or link assemblies associated with each of the gates 29, and a common drive means having a suitable interconnection with each of the link assemblies, as a result, the gates may be actuated in unison from the interior of the craft by a relatively small rotary movement of the actuating means.

The link assembly for operating each of the gates will now be described. It comprises, in each of the four instances, a bar link 33 spaced below plate 28 by spacers 34 and suitably affixed at one of its ends to the pivot 35 of the gate. At its opposite end, the bar link 33 is connected by a free pivot 36 to one end of a second bar link 37. The opposite end of the latter is carried on a fixed pivot 38 mounted at one end of a connecting bar 39 extending radially inward toward the axis of member 20 and having its inner end rigidly attached to a rotatable ring 40.

Such ring 40, in the embodiment of the invention herein shown, is rotated by a spur gear 42 spaced thereabove and meshing with a pinion 43 fixed to the upper end of a rod or shaft 45 extending down to a position in the interior of the craft from which it may conveniently be turned, as by a handcrank 46. The ring 40, as shown more clearly in FIGURES 6, 7 and 8, is split over a substantial portion of its arcuate dimension so that the pinion 43 and shaft 45 may be disposed intermediate the opposite ends 40a and 40b of the ring.

Figure 7:
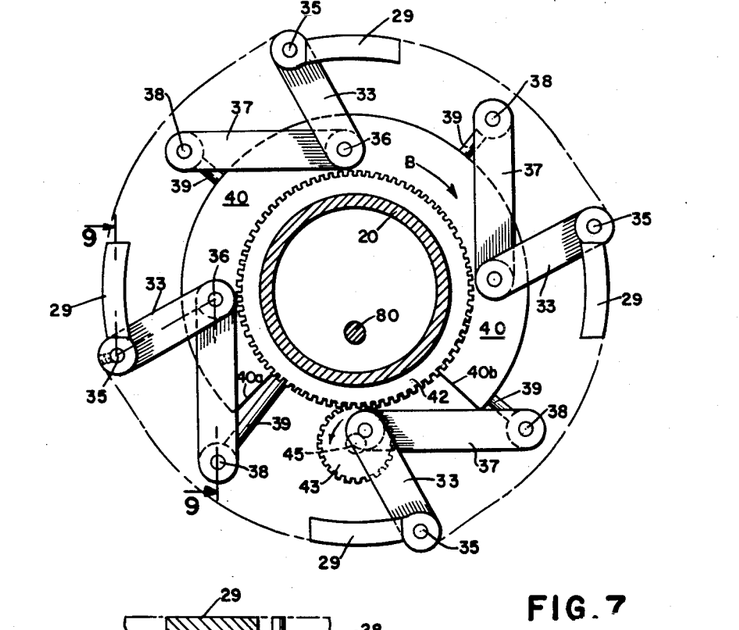
FIGURE 7 is a transverse view taken along lines 7—7 of FIGURE 5.

In operation of the gate opening mechanism, turning of the shaft 45 carrying the pinion 43 to effect a rotary movement of the ring in the direction indicated by the arrow B in FIGURES 7 and 8 will carry with it the fixed rods 39 from their full line radial positions shown in FIGURE 8. As indicated in the latter figure, this movement of the rods 39 requires rotation of the ring through only a relatively small arc of turn, namely, of the order of from about 20 to about 25 degrees.

Although a manually actuated shaft 45 is here shown as the motivating means to release the several blades, an alternate structure may be desirable. For example, pinion 43 must be turned the stated and desired distance to open each of the doors 29. In lieu of manual rotation of shaft 45, a suitable rack can be provided, which rack is designed to engage pinion 43. Such a rack can be electrically operated by means of a solenoid of the required thrust. In this alternate arrangement, with immediate response on the part of such a solenoid, the turning of the spur gear 42 is instantaneous and the response also of the various linkages which open the respective doors 29, also resultantly instantaneous.

In any event, when by either method the connecting rods or links 39 are thus caused to move from the initial one of their respective radial positions to the other one thereof, as just described, the pivot 38 moves through a corresponding arc of travel and the bar links 37 at the same time swing on pivots 38 arcuately outward with respect to rods 39 from an initially acute angular position relative thereto to a final obtuse angular position relative thereto. At the same time, the bar links 33 are caused to swing on the pivots 36 toward the link 37 and to turn pivots 35 on which the gates 29 are mounted, thereby moving the latter from the closed position shown in FIGURE 7 to the open position thereof shown in FIGURE 8. The closed position is also shown in dotted line in FIGURE 8.

When the gates have thus been opened for releasing the lower ends of the blades from the recesses 26, they are caused to move to their operative position by spring-biased means as hereinbelow described. Release and more forceful ejection of the lower ends of the blades from recesses 26 may be assisted by backer plates 47 disposed at the inner ends of the recesses and normally urged forwardly toward the outer or open ends of the recesses by suitable compression springs 48 disposed in openings 49 in plate 27 suitably adjacent the side of the recesses. A suitable means is provided to retain these compression springs seated in the openings 49 after opening of the gates 29.

The base portion 15 and tubular member 20 serve also to support the rotary hub and the spring biased means utilized for pivotally moving the blades and counterweights to operative position after release of the blades, as above described, from their inoperative position.

Figure 4:
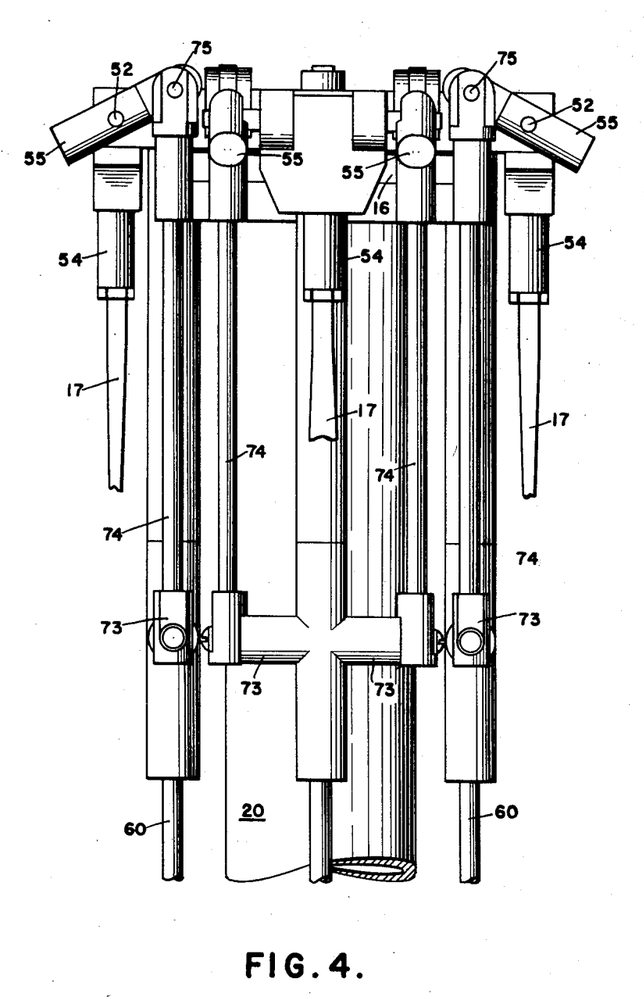
FIGURE 4 is an enlarged fragmentary view in side elevation taken at one end of the device, i.e., adjacent the root end of the rotary blades.
Figure 10:
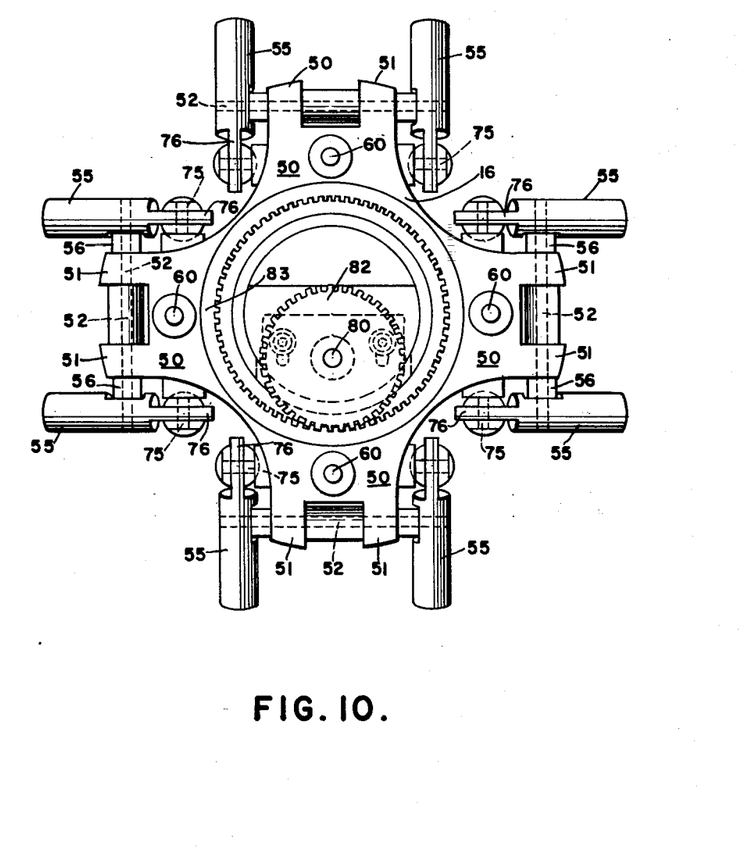
FIGURE 10 is a plan view taken along line 10—10 of FIGURE 4.
Figures 11, 12:
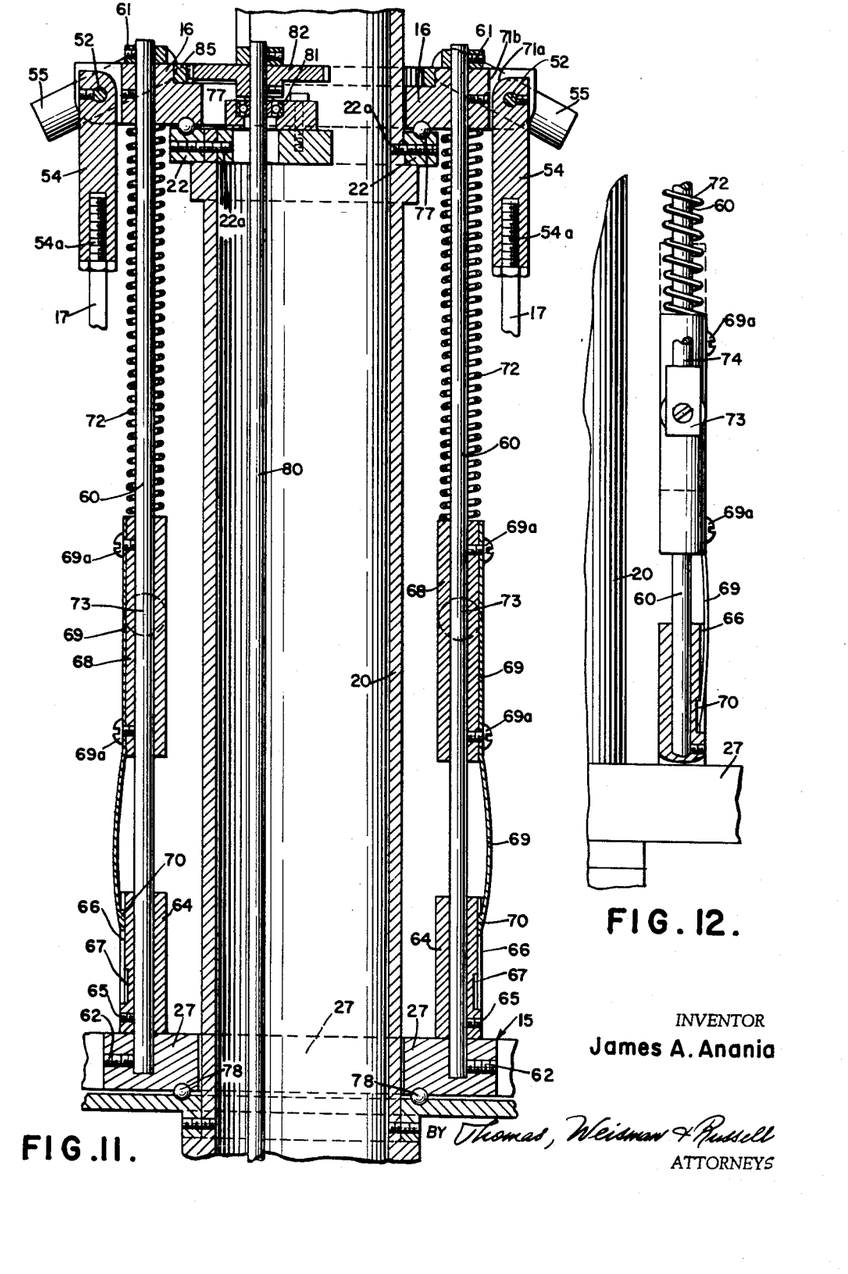
FIGURE 11 is an enlarged fragmentary view, partly in elevation and partly in section, taken longitudinally of the device with certain of its parts omitted.
FIGURE 12 is a fragmentary detail view of certain of the parts shown in FIGURE 11.

Referring particularly to FIGURES 4, 10 and 11, the hub 16 is formed with arms 50 equally spaced from one another circumferentially of the hub, each of the arms 50 being provided with spaced parallel finger portions 51 at the outer ends thereof. Each of the finger portions 51 are suitably bored, as indicated, to receive pivot pins 52 which extend between and through the respective finger portions 51. It will be observed that each blade 17 is pivotally mounted relative to the hub by means of a blade support 54 fixed to the blade as by screw threaded engagement therewith as shown at 54a, and apertured for receiving the portion of the pivot pin 52 intermediate the fingers 51.

The pivot pin 52 extends laterally beyond or externally of each side of ecah respective arm 51 and a counterweight 55 is affixed upon each of the extended ends of the pivot pin. Each counterweight is also spaced laterally outward from its adjacent finger 51 by a spacing ring 56 mounted on the pivot pin, and disposed intermediate arm 51 and counterweight 55. This entire arrangement is clearly depicted in, e.g., FIGURE 10.

The referred to counterweights or counterbalances 55 are of weights sufficient to equal or nearly equal the weight of each respective rotating blade 17. Hence the required amount of thrust need only be that to force each blade from inoperative to operative position without having to overcome the greater inertia of such blades which would be present if no counterbalance were provided.

To effect rapid pivotal movement of the blades from their inoperative to their operative position for rotary movement to retard descent of the craft, provision is also made for biasing the blades toward such movement, when such blades are released by opening the gates 29 as has been described in the foregoing. This assembly will now be described.

Four longitudinal rods 60 are mounted exteriorly of the tubular column 20. These extend vertically between hub 16 and base plate 27 at circumferentially and equally spaced locations such that the upper end of each rod extends through and is fixed by set screw elements, as shown at 61, to one of the arms 50 of the hub at a point radially inward of the blade pivot. Each rod is fixed, by means of like set screw elements 62 at its lower end to the base plate 27. Adjacent its lower end, each rod is provided with a tubular collar 64 fixed thereto by pins 65 and also provided with a longitudinally extending guideway 66 extending downwardly from its upper end and terminating in a depression or recess 67.

At a suitable location intermediate the hub 16 and the upper end of collar 64, each rod 60 is provided with a tubular collar 68 mounted in slidable engagement with the rod, and having a spring latch 69 fixed thereto by means of bolts 69a. The enlarged head 70 of this latch, of the configuration shown in, e.g., FIGURE 11, is adapted to be received in the guideway 66 of collar 64.

A coil spring 72 surrounds each rod 60 and abuts at its upper end against the lower face of the hub 16. At its lower end the spring abuts against the upper end of the collar 68. Hence it biases the latter downwardly, or constantly tends to force the collar toward the lower end of the unit.

Extending from diametrically opposed sides of each collar 68 are a pair of L-shaped arms 73 (see FIGURES 1 and 11), the vertical legs of which are each connected to a shaft 74. The upper end of the latter, in each instance, is pivoted as at 75, to a reduced extension 76 formed at the inner ends of each counterweight 55.

It will thus be seen that by virtue of the relative location of pivots 52 and 75, pivotal movement of the blades 17 downwardly on pivots 52 to their inoperative position as indicated in FIGURE 10, effects upward movement of the collars 68. This assures by reason of the pivotal connection 75 between shafts 74 and the respective counterweights 55 mounted at the ends of each of the blade pivots 52. As a result of such upward movement of the collars 68, the springs 72 are placed under compression. Consequently, when the gates 29 holding the lower ends of the blades in their inoperative position are opened, the springs 72 are able to expand and cause downward movement of the collars 68 and rods 74 which results in turning pivots 52 in a direction to move the blades 17 and counterweights 55 to their operative position, the latter position being best shown in FIGURE 1. When the collar has thus moved downwardly the required distance, the head 70 of the spring latch 69 will snap into recess 67, thereby locking the collar 68 against upward movement. Reference should here be made to FIGURE 12 which illustrates such collars in locked position, whereas, in FIGURE 11, with the blades in inoperative position, these collars or spindles 68 are shown in unlocked position.

It will thus be understood, as indicated, with these collars 68 in the locked position shown in FIGURE 12, each of the blades is maintained in a lateral or horizontal position with respect to the longitudinal axis of, for example, the tube element 20. Further, movement in an upward direction is thus prevented by this assembly.

In addition, it will be noted that each blade support 54 terminates in a flat portion 71 (FIGURE 11), the inner side of such flat portion 71 being rounded, as at 71a. This end shape of each blade support is thus of such nature that the flat, abutting portion 71, being scaled to accomplish this function, will directly abut or engage the corresponding surface 71b of the member 16 when the blades are in extended position. When in such contact, this configuration also will tend to prevent (in addition to the locking mechanism represented by the collars 68) movement beyond the lateral position as such is illustrated in, e.g., FIGURE 1.

At any convenient moment during or after such movement of the blades and counterweights to operative position, rotation of hub 16 may be initiated in any convenient manner by the operator aboard the craft.

Rotation of the hub 27 on its bearing supports 22 may be effected by a motor driven shaft 80. The plate 16 and hub 27 are both mounted in anti-friction relationship through use of ball bearings 77 and 78 at the locations shown (FIGURE 11). The referred to drive shaft 80 extends vertically through tube 20, and is preferably mounted eccentrically thereof. At its upper end, the shaft is also preferably supported in an anti-friction bearing 81. It is provided with a pinion 82 which meshes with an internal ring gear 83 fixed concentrically to the hub or rotating plate 16.

As will be apparent from the foregoing description, by reason of the rigid connection between the hub and the base plate 27 afforded by the described rods 60, these parts will rotate as a unit relative to the stationary tubular column 20, thus carrying with them the rotating blades 17.

No particular type of motor has here been shown with respect to rotation of the assembly which is inclusive of the base plates 16 and 27, rod elements 60, and accompanying mechanism, all of which assembly rotates with rotation of the blades. However, it is obvious that shaft 80, which is the primary mover in effectuating such rotation can be motor driven by any suitable means. Considering space requirements, a turbine drive is visualized as appropriate although an electric drive is also considered to be adaptable to this purpose.

Figure 13:
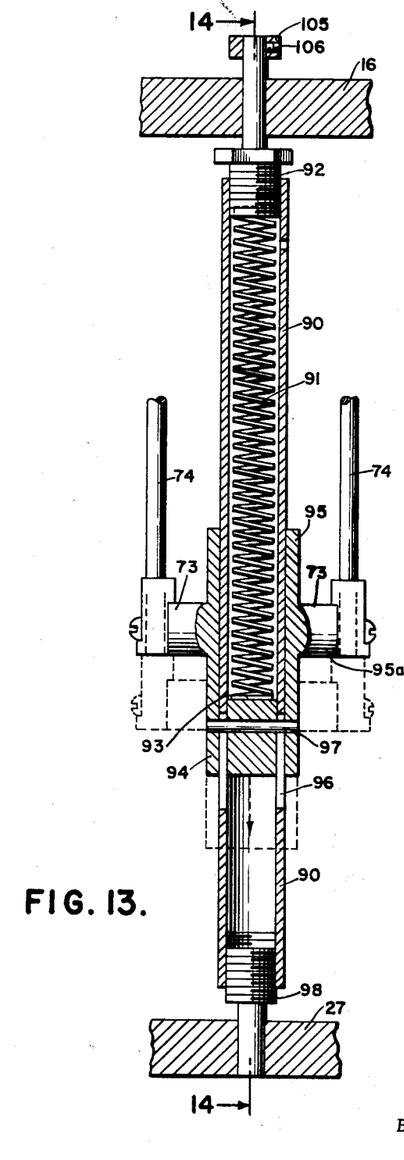
FIGURE 13 is a view in longitudinal section showing a modified arrangement of mechanism for effecting movement of the rotor blades of the device into their operative portion.
Figure 14:
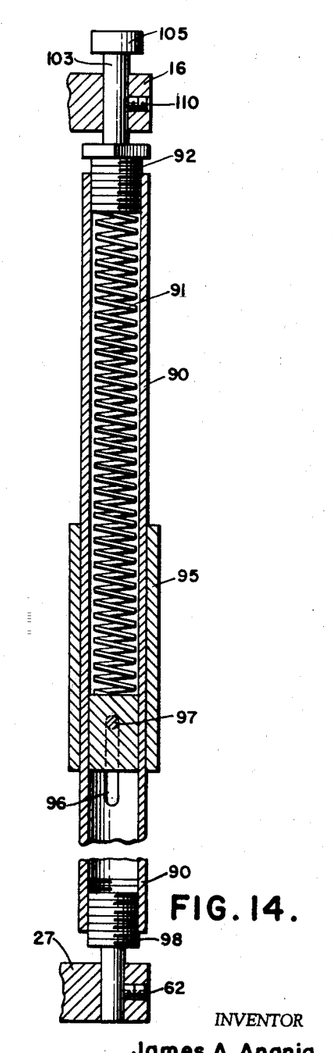
FIGURE 14 is a view taken along line 14—14 of FIGURE 13.

In FIGURES 13 and 14 there is shown a modified arrangement of the spring biased means, and its support, for moving the blades to operative position. In this arrangement, in lieu of rods 60, coil springs 72 encircling the same, and collars 64 and 68, there are employed hollow tubes 90, within which compression springs 91 are housed. The upper end of each spring abuts a plug 92 in threaded engagement with the upper end of each tube and in fixed relation to the hub. The lower end of the spring abuts the inner surface 93 of the lower closed end 94 of a sleeve 95 in slidable engagement with the tube 90 and having the rods 74 fixed to arms 95a extending radially therefrom. Each tube 90 is provided, adjacent its lower end, with elongated slots 96 extending longitudinally at diametrically opposite sides thereof, to receive the ends of a pin 97 extending transversely through the closed end of the sleeve. At its lower end, each tube 90 is in threaded engagement with a plug 98 fixed in any suitable manner to base plate 27.

From the foregoing, it will be seen that upon opening of the blade-retaining gates 29, the spring 91, held under compression in the full-line position of the sleeve shown in FIGURE 13 will cause the sleeve to slide downwardly along the tube to the dotted-line position and by means of the pivoted connection of rods 74 with the counterweights 18, effect rapid pivoting of the blade outward into operative position.

Further with respect to the alternate assembly illustrated in FIGURES 13 and 14, it will also be observed that means have been provided for the adjustment of the amount of spring bias exerted by springs 91. This is accomplished in the following manner: as stated, the threaded element 92 is inserted at the upper end of the tubular element 90, each spring bearing against the base of such plug 92. The latter has a shaft or extension 103 which extends through the base plate 16, such shaft terminated in a retaining collar 105, the latter being retained in fixed position by means of an appropriate set screw 106, as indicated in FIGURE 13.

It will thus appear that, depending upon the distance threaded element 92 extends into the tube 90, the amount of spring tension or bias exerted by spring 90 can be varied. When this adjustment is of the desired and predetermined amount, the element or plug 92 is locked in place by any convenient means, the one here illustrated being set screw 110, suitably threaded into the plate 16 as to bear against shaft 103.

From the foregoing detailed explanation, the operation of this invention, in actual practice, should be self-evident. The entire structure of the speed retarding device, with the exception of a motor means to rotate the blades, is positioned within the housing of the nose cone of the capsule during take-off and during horizontal flight.

Upon re-entry, the instrument is used to retard descent, once the atmosphere is encountered. The first step by the operator or astronaut at this point is to dispose of the housing 24 by any convenient method which may be employed, such as the use of explosive force to separate halves 24a and 24b, and the latter are thus thrust aside and discarded, exposing mechanism for positioning the several blades in operative position, i.e., extended laterally to the longitudinal axis of the capsule, as illustrated in FIGURE 1.

The operator then opens the several doors 29 by hand manipulation through turnwheel 46, or by an electrical solenoid means, as explained above. Opening of these doors immediately releases the several blades 17 which are thrust outwardly with considerable force, and instantaneously by the biased spring means 48.

The blades are maintained in position by the several rod means 60 and related assemblies which have been explained in the foregoing.

The descent, depending upon the size, number and pitch of the several blades 17 can be one utilizing the autogyric principle, where the blades are self-propelled simply due to the force of air pressure thereagainst. In the alternative and as explained with reference to the preferred embodiment of the invention, however, these blades are propelled by suitable motor means. In the latter instance, the speed of rotation thereof will control descent, and whereas such speed may be greater at higher altitude, due to relative thinness of the atmosphere, such speed can be reduced upon descent as the surrounding atmosphere increases in density. In any event, speed of descent is within control of the operator, or within the control of appropriate ground actuation means. Blade rotation may thus be obtained at an r.p.m. consistent with a very slow speed of descent as the capsule approaches the earth and ground contact.

Although the instant description of the invention has been made with respect to a preferred embodiment thereof, it is obvious that many other expedients and alternates may be employed, yet fall within the scope thereof; therefore, the invention is not to be considered limited in any respects except as limited by the scope of the claims appended hereto.

I claim:

1. In a spacecraft mechanism, means to retard descent thereof upon re-entry into the earth's atmosphere, said means comprising the combination of: a space capsule, a tubular element extending upwardly from said capsule, opposed rotatable plates adjacent the upper and lower ends of said element, a plurality of spaced rods interconnecting said plates, a plurality of blades mounted for alternate positioning against said element and outward, extended operative position, means to release said blades to said operative position, means to lock said blades in said operative position, means comprising a bias spring element upon each of said rods arranged to exert thrust upon the inner ends of said blades to extend said blades to operative position upon actuation of said release means, and means within said capsule to rotate said plates, said rods and said blades, said locking means comprising a movable collar on the lower end of each rod adapted to bear against said spring bias element, a downwardly depending spring element on the lower end of each of said collars, said spring element having a catch on the lower end thereof, and a catch receiving depression adjacent said lower plate to receive said catch.

2. In a spacecraft mechanism, means to retard descent thereof upon re-entry into the earth's atmosphere, said means comprising the combination of: a space capsule, a tubular element extending upwardly from said capsule, opposed rotatable plates adjacent the upper and lower ends of said element, at least four spaced rods interconnecting said plates, four spaced and radial blades pivotally mounted for alternate positioning against said element and outward, extended operative position, each of the pivotal ends of said blades being disposed adjacent one of said spaced rods, means to release said blades to said operative position, said last named means comprising a bias spring element upon each of said rods arranged to exert thrust against said blades to extend said blades to operative position upon actuation of said release means, means to lock said blades in said operative position, means within said capsule to rotate said plates, said rods and said blades, and disposable housing means surrounding said blades, plates and rods provided with means for discard thereof upon re-entry with the earth's atmosphere, said lower plate being provided with releasable door means within which the lower respective ends of each of said blades are housed while in inoperative position, and manually controllable means to open said door means upon release of said blades to extended, operative position.

3. In a spacecraft mechanism, means to retard descent thereof upon re-entry into the earth's atmosphere, said means comprising the combination of: a space capsule having a nose cone, a disposable housing underneath and adjacent said nose cone, a tubular element in said housing extending upwardly from said capsule, opposed rotatable plates within said housing adjacent the upper and lower ends of said element, a plurality of spaced rods within said housing interconnecting said plates, a plurality of blades mounted for alternate positioning against said element while within said housing and outward, extended operative position when said housing is discarded, means to release said blades to said operative position, said last named means comprising a bias spring element upon each of said rods arranged to exert thrust against said blades to extend said blades to operative position upon actuation of said release means, means actuable within said capsule to discard said disposable housing upon re-entry, means to rotate said blades at speeds to retard descent of said capsule, and means to automatically lock said blades in said operative position.

4. The invention as defined in claim 2 wherein a spring biased pusher element is disposed to bear against the outer end of each of said blades when in inoperative position, said pusher element forcibly ejecting said blade outwardly upon actuation of said door opening means.

5. In a spacecraft mechanism, means to retard descent thereof upon re-entry into the earth's atmosphere, said means comprising the combination of: a space capsule having a nose cone, a disposable housing underneath and adjacent said nose cone, a tubular element in said housing extending upwardly therefrom and in fixed relationship with respect thereto, a rotatable plate disposed at the upper and lower ends of said tubular element, a plurality of hollow shafts within said housing interconnecting said plates, a plurality of rotor blades mounted for alternate positioning against said element while within said housing and outward, extended operative position when said housing is discarded, and means to release said blades to said operative position comprising a bias spring element within each of said hollow shafts adapted to bear against the inner end of each of said rotor blades to extend said blades to operative position upon actation of said release means, means to automatically lock said blades in said operative position, and means to rotate said blades at speeds to retard descent of said capsule upon re-entry into the atmosphere.

References Cited by the Examiner
UNITED STATES PATENTS

| | | | |
|---|---|---|---|
| 2,654,320 | 10/53 | Schmid | 244—138 X |
| 2,684,213 | 7/54 | Robert et al. | 244—8 |
| 3,016,217 | 1/62 | Polleys et al. | 244—138 |

FERGUS S. MIDDLETON, *Primary Examiner.*

ANDREW H. FARRELL, MILTON BUCHLER,
*Examiners.*